United States Patent
Hock et al.

(10) Patent No.: US 10,552,526 B2
(45) Date of Patent: Feb. 4, 2020

(54) GRAPHICAL USER INTERFACE FOR FIELD CALCULATIONS

(71) Applicant: SuccessFactors, Inc., South San Francisco, CA (US)

(72) Inventors: David Joseph Hock, Poway, CA (US); Wesley Johnson, McLean, VA (US)

(73) Assignee: SuccessFactors, Inc., South San Francisco, CA (US)

( * ) Notice: Subject to any disclaimer, the term of this patent is extended or adjusted under 35 U.S.C. 154(b) by 89 days.

(21) Appl. No.: 14/970,123

(22) Filed: Dec. 15, 2015

(65) Prior Publication Data

US 2017/0169003 A1  Jun. 15, 2017

(51) Int. Cl.
*G06F 17/24* (2006.01)
*G06F 3/0484* (2013.01)

(52) U.S. Cl.
CPC ........ *G06F 17/243* (2013.01); *G06F 3/04847* (2013.01)

(58) Field of Classification Search
None
See application file for complete search history.

(56) References Cited

U.S. PATENT DOCUMENTS

| | | | |
|---|---|---|---|
| 5,418,950 A * | 5/1995 | Li | G06F 17/30398 707/769 |
| 6,137,488 A * | 10/2000 | Kraft | G06F 3/04895 707/999.004 |
| 7,185,317 B2 * | 2/2007 | Fish | G06F 8/34 717/121 |
| 7,844,587 B2 * | 11/2010 | Blakeley | 707/705 |
| 8,117,327 B2 | 2/2012 | Carroll et al. | |
| 8,219,523 B2 * | 7/2012 | Ben Harush | G06F 17/30306 707/610 |
| 8,414,513 B1 | 4/2013 | Earle | |
| 8,675,683 B2 | 3/2014 | Valk et al. | |
| 9,460,415 B2 * | 10/2016 | Brunswig | G06Q 10/10 |
| 2004/0176967 A1 | 9/2004 | Whittenberger | |
| 2004/0193579 A1 * | 9/2004 | Dettinger | G06F 17/30398 |
| 2006/0106776 A1 * | 5/2006 | Dettinger | G06F 17/30398 |
| 2006/0155689 A1 * | 7/2006 | Blakeley | G06F 17/30595 |
| 2006/0161521 A1 * | 7/2006 | Dettinger | G06F 17/3043 |
| 2006/0161533 A1 * | 7/2006 | Selca | G06F 17/30392 |
| 2006/0287987 A1 | 12/2006 | McGeachie et al. | |
| 2007/0078729 A1 | 4/2007 | Brown | |
| 2007/0124066 A1 | 5/2007 | Kikuchi et al. | |

(Continued)

OTHER PUBLICATIONS

Susan Traynor, Worklogix Whitepapers—Harnessing the Power of SAP Query in SAP HCM part II, Published Sep. 15, 2014, pp. 1-81.*

*Primary Examiner* — Howard Cortes
(74) *Attorney, Agent, or Firm* — Fountainhead Law Group P.C.

(57) ABSTRACT

Some embodiments provide a non-transitory machine-readable medium that stores a program executable by at least one processing unit of a device. The program provides, through a graphical user interface (GUI), a tool for creating a field calculation that operates on data defined in a relational data model. The program also receives, through the GUI, the field calculation created using the tool. The program further generates data for a data integration operation based on the field calculation. The program also performs the data integration operation based on the generated data.

20 Claims, 10 Drawing Sheets

(56) References Cited

U.S. PATENT DOCUMENTS

| | | | |
|---|---|---|---|
| 2008/0016253 A1* | 1/2008 | Boctor | G06F 8/34 709/250 |
| 2008/0082521 A1* | 4/2008 | Danielson | G06F 17/30716 |
| 2008/0104542 A1* | 5/2008 | Cohen | G06F 17/30864 715/810 |
| 2009/0125830 A1* | 5/2009 | Marcek | G06F 9/4443 715/771 |
| 2009/0319544 A1 | 12/2009 | Griffin et al. | |
| 2010/0161101 A1* | 6/2010 | Pouyez | G06Q 10/10 700/108 |
| 2010/0228574 A1 | 9/2010 | Mundinger et al. | |
| 2011/0035744 A1* | 2/2011 | Bhatia | G06F 17/30893 717/174 |
| 2011/0078569 A1* | 3/2011 | Lorch | G06F 17/3061 715/708 |
| 2011/0153575 A1* | 6/2011 | Glasser | G06F 11/3684 707/690 |
| 2011/0213759 A1* | 9/2011 | Zazrivec | G06F 17/30297 707/695 |
| 2012/0159392 A1* | 6/2012 | Kauerauf | G06F 17/30554 715/826 |
| 2012/0166459 A1* | 6/2012 | Ritter | G06F 17/30569 707/756 |
| 2012/0254201 A1* | 10/2012 | Cochrane | G06F 17/30572 707/754 |
| 2013/0166550 A1* | 6/2013 | Buchmann | G06F 17/30997 707/736 |
| 2013/0254145 A1 | 9/2013 | Salisbury et al. | |
| 2013/0304531 A1* | 11/2013 | Barber | G06Q 10/06 705/7.12 |
| 2015/0074140 A1* | 3/2015 | Hutzel | G06F 17/30507 707/769 |
| 2015/0154269 A1* | 6/2015 | Miller | G06F 17/30554 715/780 |
| 2015/0286720 A1* | 10/2015 | Walsh | G06F 17/30126 707/804 |
| 2016/0034526 A1* | 2/2016 | Pringuey | G06F 17/30395 707/721 |
| 2017/0078094 A1* | 3/2017 | Olson | H04L 9/30 |
| 2017/0168665 A1 | 6/2017 | Hock | |
| 2017/0169099 A1 | 6/2017 | Hock et al. | |

* cited by examiner

GRAPHICAL USER INTERFACE FOR FIELD CALCULATIONS

BACKGROUND

Computing systems (e.g., enterprise systems) may be used for managing large amounts of data. Different computing systems may manage data using different techniques. For instance, some computing systems store data based on to a relational data model. In such a model, data is organized and/or stored according to defined entities and relationships among the entities.

In some instances, a computing system may export data to another computing system (e.g., a third-party system). For complex relational data models that have a large number of entities and/or relationships, identifying the desired data to export to another computing system may be difficult and/or time consuming. For example, a user of the computing system may need to manually traverse through the relational data model in order to identify the desired data.

When a computing system exports data to another computing system, the other computing system may expect data that is not directly available from the attributes of an entity. For example, the other computing system may require data that includes street, city, state, and zip code in a single string while the computing system may store the street, city, state, and zip code as separate attributes of an entity. In such an example, the computing system may aggregate the attributes into a single string before exporting the data to the other computing system.

SUMMARY

In some embodiments, a non-transitory machine-readable medium stores a program executable by at least one processing unit of a device. The program provides, through a graphical user interface (GUI), a tool for creating a field calculation that operates on data defined in a relational data model. The program also receives, through the GUI, the field calculation created using the tool. The program further generates data for a data integration operation based on the field calculation. The program also performs the data integration operation based on the generated data.

In some embodiments, the program further provides, through the GUI, a UI control for specifying an operation element for the field calculation. Providing the UI control may include providing the UI control based on a data type associated with the field calculation. The UI control may be a first UI control. The program also provides, through the GUI, a second UI control for specifying the operation element for the field calculation based on the first UI control. In some embodiments, the first UI control is for specifying an operand in the operation element for the field calculation and the second UI control is for specifying an operator in the operation element for the field calculation.

In some embodiments, generating the data includes retrieving data from a data source according to the relational data model and the field calculation. Performing the data integration operation may include sending the generated data to a system in order for the system to integrate the data into the system.

In some embodiments, a method provides, through a graphical user interface (GUI), a tool for creating a field calculation that operates on data defined in a relational data model. The method also receives, through the GUI, the field calculation created using the tool. The method further generates data for a data integration operation based on the field calculation. The method also performs the data integration operation based on the generated data.

In some embodiments, the method further provides, through the GUI, a UI control for specifying an operation element for the field calculation. Providing the UI control may include providing the UI control based on a data type associated with the field calculation. The UI control may be a first UI control. The method also provides, through the GUI, a second UI control for specifying the operation element for the field calculation based on the first UI control. In some embodiments, the first UI control is for specifying an operand in the operation element for the field calculation and the second UI control is for specifying an operator in the operation element for the field calculation.

In some embodiments, generating the data includes retrieving data from a data source according to the relational data model and the field calculation. Performing the data integration operation may include sending the generated data to a system in order for the system to integrate the data into the system.

In some embodiments, a system includes a set of processing units and a non-transitory machine-readable medium that stores a program executable by at least one processing unit in the set of processing units. The program provides, through a graphical user interface (GUI), a tool for creating a field calculation that operates on data defined in a relational data model. The program also receives, through the GUI, the field calculation created using the tool. The program further generates data for a data integration operation based on the field calculation. The program also performs the data integration operation based on the generated data.

In some embodiments, the program further provides, through the GUI, a UI control for specifying an operation element for the field calculation. Providing the UI control may include providing the UI control based on a data type associated with the field calculation. The UI control may be a first UI control. The program also provides, through the GUI, a second UI control for specifying the operation element for the field calculation based on the first UI control. In some embodiments, the first UI control is for specifying an operand in the operation element for the field calculation and the second UI control is for specifying an operator in the operation element for the field calculation. Generating the data may include retrieving data from a data source according to the relational data model and the field calculation.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for creating field calculations that operate on data modeled based on a relational data model. In some embodiments, a relational data model defines entities and relationships among the entities. Each entity may include one or more attributes and one or more relationships. A relationship between two entities may specify a type of relationship (e.g., a one-to-one relationship, a one-to-many relationship, a many-to-one relationship, a many-to-many relationship, etc.). In some embodiments, a GUI provides a tool for creating field calculations (also referred to as calculated fields). A field calculation is a defined set of operations on several entity attributes that, when performed, produces a data value (e.g., a string, a number, etc.).

Figure 1:
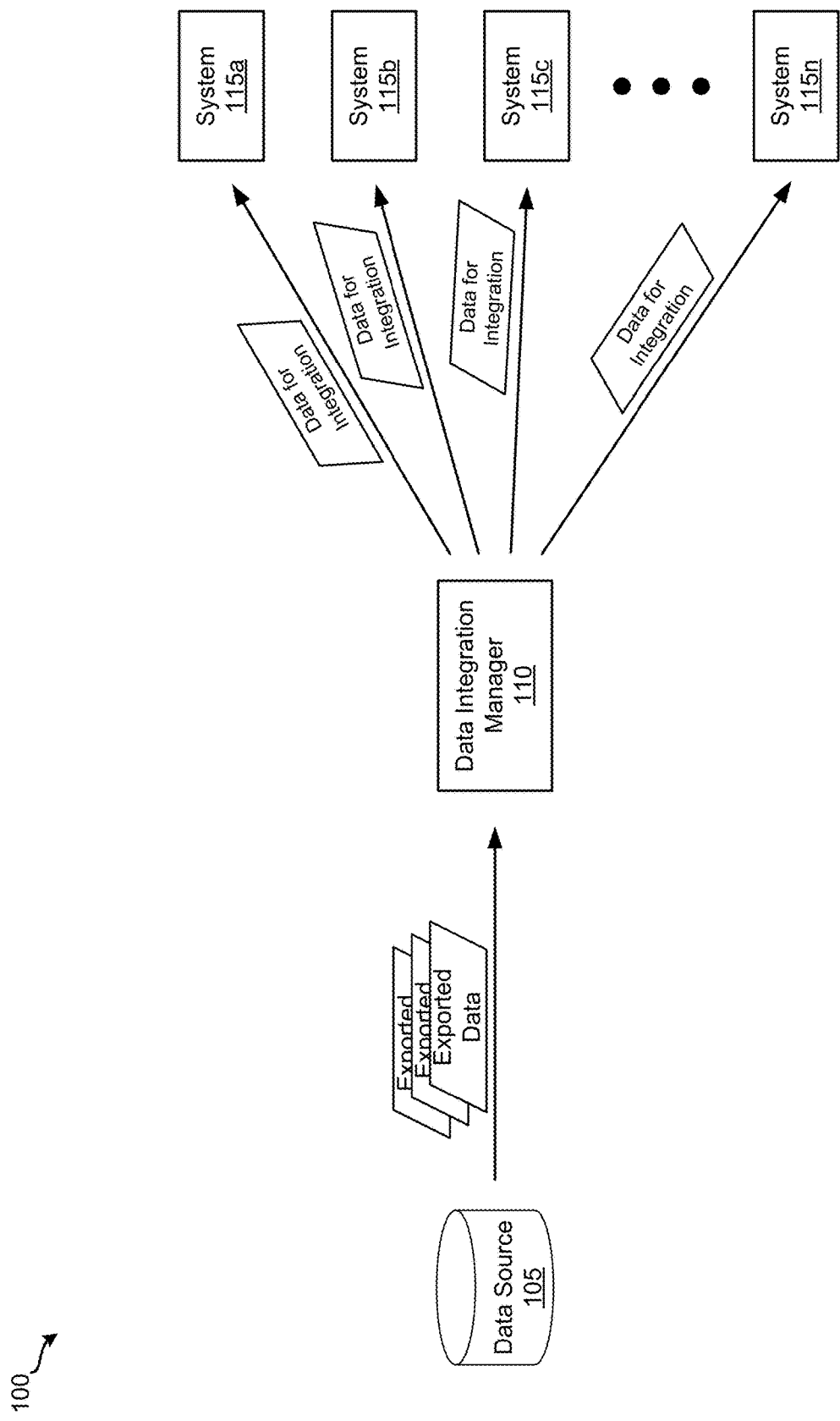
FIG. 1 illustrates a data flow of a system for integrating data according to some embodiments.

FIG. 1 illustrates a data flow of a system 100 for integrating data according to some embodiments. As shown, system 100 includes data source 105, data integration manager 110, and systems 115a-n. In some embodiments, data source 105 and data integration manager 110 are part of the same system while, in other embodiments, data source 105 and data integration manager 110 operate on separate systems.

Data source 105 is configured to provide data to data integration manager 110. In some embodiments, data source 105 stores and manages data based on a relational data model. For example, data source 105 stores data that describes entities defined by the relational data model and data that describes relationships among the entities defined by the relational data model. In some embodiments, data source 105 is implemented by several storages (e.g., hard disk storages, flash memory storages, optical disc storages, etc.) while, in other embodiments, data source 105 is implemented by a single storage. In some embodiments, data source 105 is a database, a file, a data as a service (DaaS), a web service, etc.

Data integration manager 110 may be configured to integrate data from data source 105 into systems 115a-n. As shown in FIG. 1, data integration manager 110 is receiving exported data from data source 105. In some embodiments, data integration manager 110 retrieves the exported data from data source 105 while, in other embodiments, data source 105 sends the exported data to data integration manager 100 in response to data integration manager 110 sending data source 105 a request for the exported data. Upon receiving the exported data, data integration manager 110 sends the exported data to a system 115 as data for integration into the system 115. In some embodiments, the exported data is sent to a system 115 as a file according to a file format (e.g., a comma-separated values (CSV) file).

In some embodiments, before sending the exported data to a system 115, data integration manager 110 may format the exported data according to a certain format in which the system 115 expects the data. For example, a system 115 may expect to receive address data (e.g., street, city, state, zip code, etc.) as a single string, as a collection of strings and/or numbers, etc. As another example, a system 115 may expect to receive name data (e.g., first name, middle name, last name, etc.) as a single string, as a collection of strings and/or numbers, etc. One of ordinary skill in the art will appreciate that any number of different types of data may be formatted any number of different ways.

Data integration manager 110 may perform data integration operations at different times. For example, data integration manager 110 may perform a data integration operation at a specified time (e.g., a scheduled time), at defined intervals (e.g., once a day, once every five days, once a week, once a month, etc.), in response to a request from a system 115, etc.

In some embodiments, data integration manager 110 is a data integration service or tool that is part of a multi-tenant, cloud-based system implemented using a software as a service (SaaS) methodology. One of ordinary skill in the art will understand that data integration manager 110 may be part of any number of different systems (e.g., a human capital management (HCM) system, an enterprise resource planning (ERP) system, a customer relationship management (CRM) system, a supply chain management (SCM) system, a product lifecycle management (PLM) system, etc.).

Systems 115a-n are configured for receiving data stored in data source 105 via data integration manager 110. In some embodiments, a system 115 may expect data that system 115 receives from data integration manager 110 to be in a certain format (e.g., by sending to data integration manager 110 a request to send data to the system 115 according to the certain format). For example, a system 115 may expect to receive address data (e.g., street, city, state, zip code, etc.) as a single string, as a collection of strings and/or numbers, etc.

Systems 115a-n may be third-party systems that operate on computing systems separate from data source 105 and data integration manager 110. Examples of third-party systems include a payroll system, a background screening system, a finance system, a learning management system (LMS), a human resource management system (HRMS), a human resources information system (HRIS), a time management system, an employee benefits system, etc.

As illustrated in FIG. 1, system 100 includes one data source. One of ordinary skill in the art will realize that system 100 may include any number of additional and/or different data sources from which data integration manager 110 may integrate data into systems 115a-n.

Figure 2:
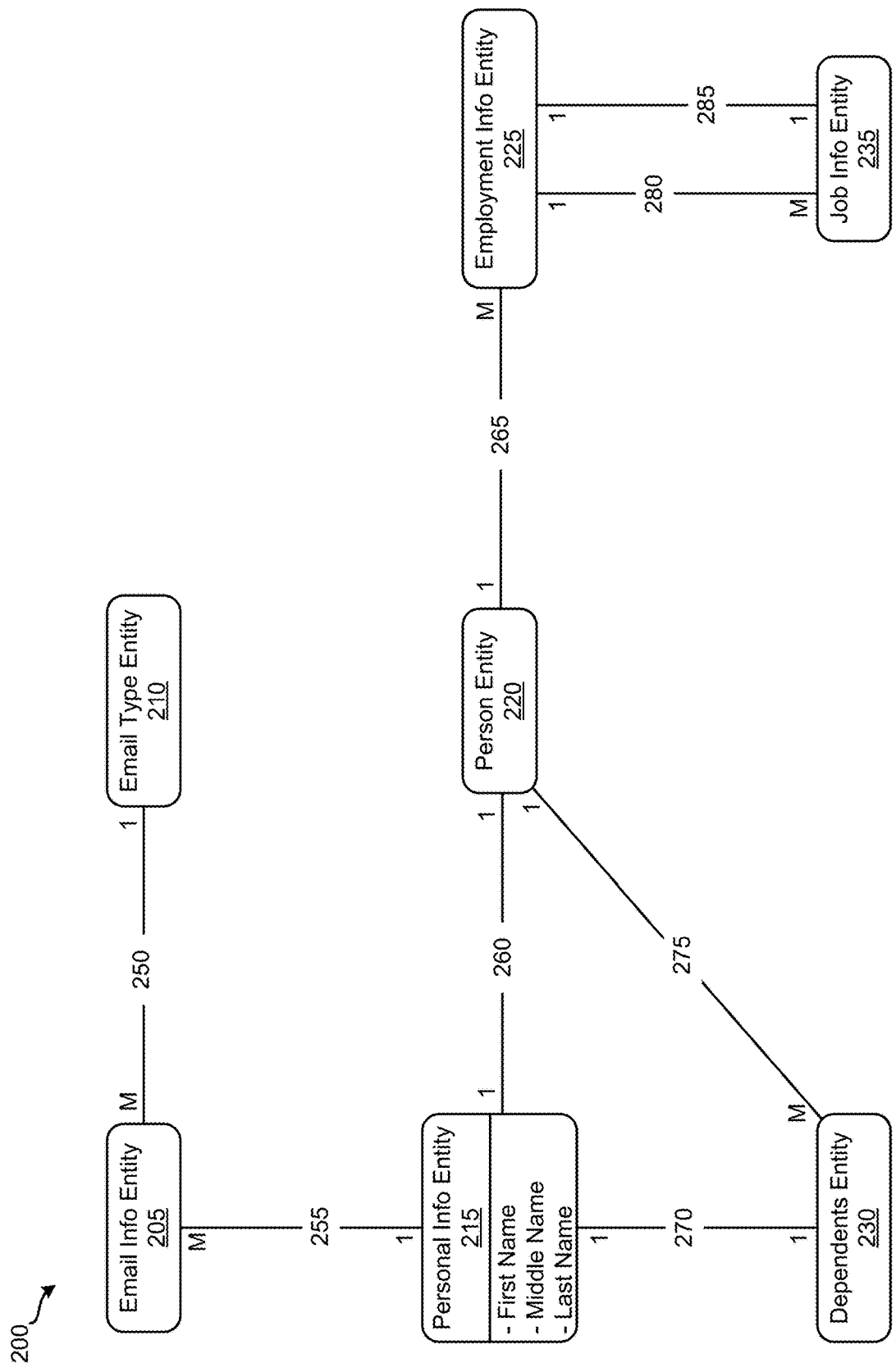
FIG. 2 illustrates an example relational data model according to some embodiments.

As mentioned above, data source 105 may store and manage data based on a relational data model. FIG. 2 illustrates an example relational data model 200 according to some embodiments. In this example, relational data model 200 defines entities and relationships among the entities for describing personal information and employment information associated with people. As described above, a relational data model defines entities and relationships among the entities in some embodiments. Each entity may include one or more attributes and one or more relationships.

As illustrated in FIG. 2, relational data model 200 includes email info entity 205, email type entity 210, personal info entity 215, person entity 220, employment info entity 225, dependents entity 230, and job info entity 235. For this example, email info entity 205 represents information associated with an email, email type entity 210 represents a type of email, personal info entity 215 represents personal information associated with a person, person entity 220 represents a person, employment info entity 225 represents information associated with a place of employment, dependents entity 230 represents a dependent of a person, and job info entity 235 represents information associated with a job. As shown in FIG. 2, personal info entity 215 includes a first name attribute, middle name attribute, and a last name attribute. One of ordinary skill in the art will understand that entities 205, 210, 215, 220, 225, 230, and 235 may include any number of additional and/or different attributes. However, for the purposes of simplicity and explanation, attributes of entities 205, 210, 215, 220, 225, 230, and 235 are not shown except for the first name, middle name, and last name attributes of personal info entity 215.

As explained above, a relationship between two entities may specify a type of relationship (e.g., a one-to-one relationship, a one-to-many relationship, a many-to-one relationship, a many-to-many relationship, etc.). FIG. 2 illustrates relationships 250, 255, 260, 265, 270, 275, 280, and 285 among entities 205, 210, 215, 220, 225, 230, and 235. In this example, a person has one or more places of employment, one set of personal information about the person, and one or more dependents. As such, relationship 265 between person entity 220 and employment info entity 225 is a one-to-many relationship with, relationship 260 between person entity 220 and personal info entity 215 is a one-to-one relationship, and relationship 275 between person entity 220 and dependents entity 230 is a one-to-many relationship, respectively.

For a place of employment in this example, a person has one or more jobs at the place of employment. Thus, relationship 280 between employment info entity 225 and job info entity 235 is a one-to-many relationship. In this example, a person has one manager for each job. This relationship is defined in relational data model 200 through relationship 285 between job info entity 235 and employment info entity 225, which is a one-to-one relationship. Specifically, a relationship 285 represents a relationship between the job information of a person and the employment information of the person's manager. In this example, employment information of a manager of a person may be accessed by navigating from job info entity 235 to employment info entity 225 via relationship 285. The personal information of the manager of the person may be accessed by continuing to navigate from employment info entity 225 to personal info entity 215 via relationships 265 and 260.

A dependent in this example has one set of personal information about the dependent. Accordingly, dependent entity 230 has a one-to-one relationship with personal info entity 215. In this example, the personal information for a person has one or more emails. As such, personal info entity 215 has a one-to-many relationship with email info entity 205. Each email in this example may be of a certain type (e.g., personal email, business email, secondary email, etc.) and many emails may be of the same type. Thus, email info entity 205 has a many-to-one relationship with email type entity 210.

As described above, FIG. 2 illustrates an example relational data model. One of ordinary skill in the art will appreciate that the entities, relationships, and types of relationships depicted in FIG. 2 are used for the purposes of simplicity and explanation and that relational data model 200 may include any number of additional and/or different entities, relationships, and/or types of relationships.

Figure 3:
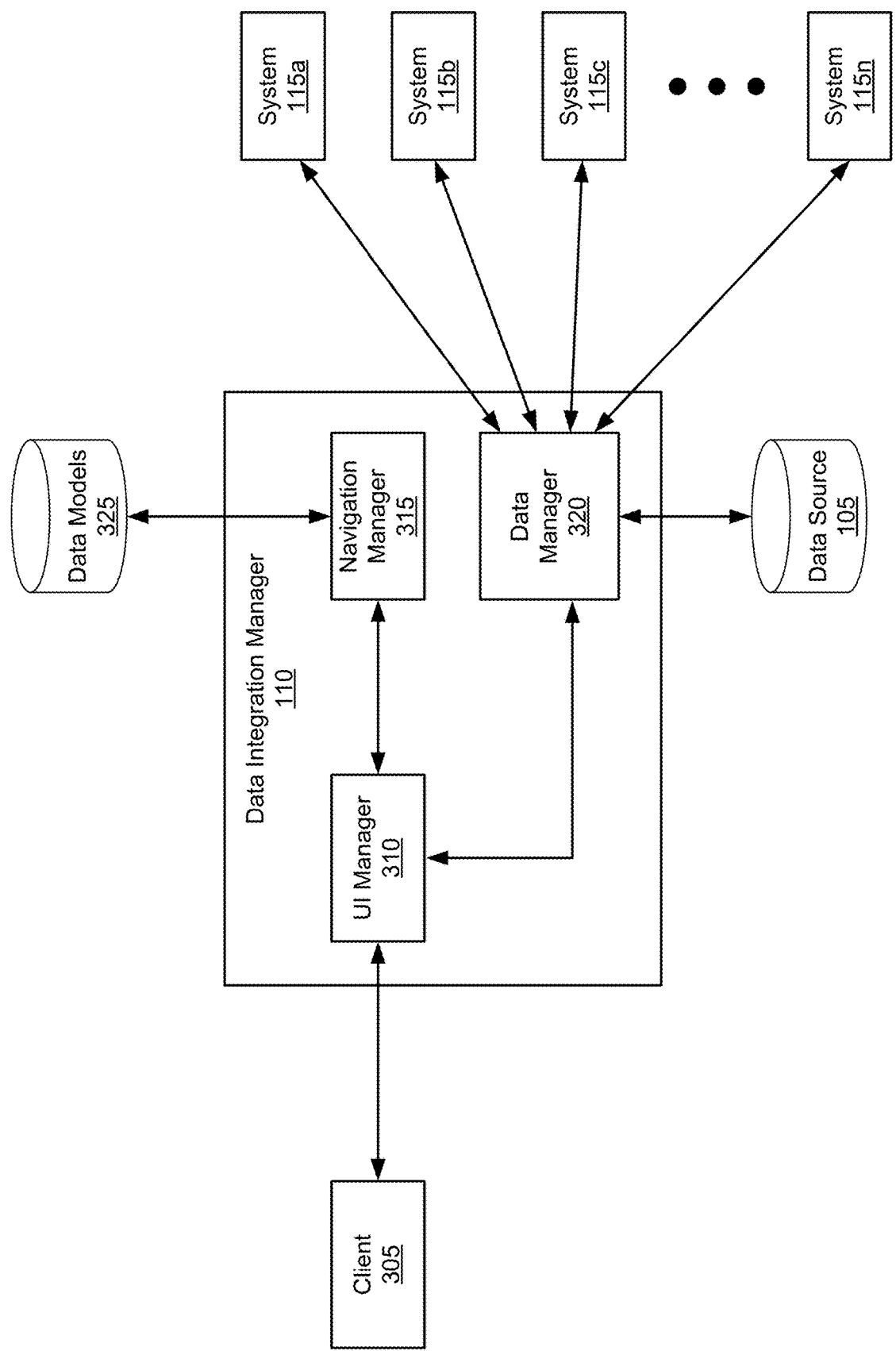
FIG. 3 illustrates an architecture of a data integration manager according to some embodiments.

FIG. 3 illustrates an architecture of data integration manager 110 according to some embodiments. As shown, data integration manager 110 includes a user interface (UI) manager 310, a navigation manager 315, and a data manager 320. UI manager 310 is configured to provide UIs (e.g., GUIs, command line interfaces (CLI), etc.) to client 305 for interacting with the data integration manager 110. Client 305 may be any type of computing device (e.g., a mobile device, a smartphone, a laptop, a desktop computer, a tablet, etc.). Client 305 may include a thin client (e.g., a web browser) configured to interact with the UIs provided by UI manager 310. In some embodiments, client 305 and data integration manager 110 operate on the same computing device while, in other embodiments, client 305 and data integration manager 110 operate on separate computing devices.

Navigation manager 315 is responsible for navigating through a relational data model (e.g., relational data model 200) to identify routes through the relational data model. Navigation manager 315 may receive a request from UI manager 310 to determine routes through a relational data model. In response to such a request, navigation manager 315 may access the relational data model in data models 325, which is configured to store relational data models, in order to determine routes through the relational data model. Upon determining routes through the relation data model, navigation manager 315 sends the determined routes to UI manager 310.

Data manager 320 may handle retrieving data from data source 105 and sending the retrieved data to one or more systems 115 for integration into the one or more systems 115. In some embodiments, before sending the retrieved data to a system 115, data manager 320 may format retrieved data according to a certain format in which the system 115 expects the data. Data manager 320 may receive a request from UI manager 310 to integrate data from data source 105 to one or more systems 115. The request may specify the data for integration, a relational data model, a route through the relational data model to access the data for integration, and one or more systems 115. In response to the request, data manager 320 retrieves the requested data from data source 105 based on the relational data model and the route through the relational data model. Upon retrieving the requested data from data source 105, data manager 320 sends the retrieved data to the specified one or more systems 115.

Data manager 320 may also handle generating data from field calculations. As mentioned above, a field calculation is a defined set of operations on several entity attributes that, when performed, produces a data value. In some embodiments, data manager 320 generates data from a field calculation by retrieving data specified in the field calculation and performing the operations specified in the field calculation on the retrieved data. Generated data may be the requested data for a data integration operation in some cases. In some such cases, data manager 320 sends the generated data to the specified one or more systems 115.

Figure 4:
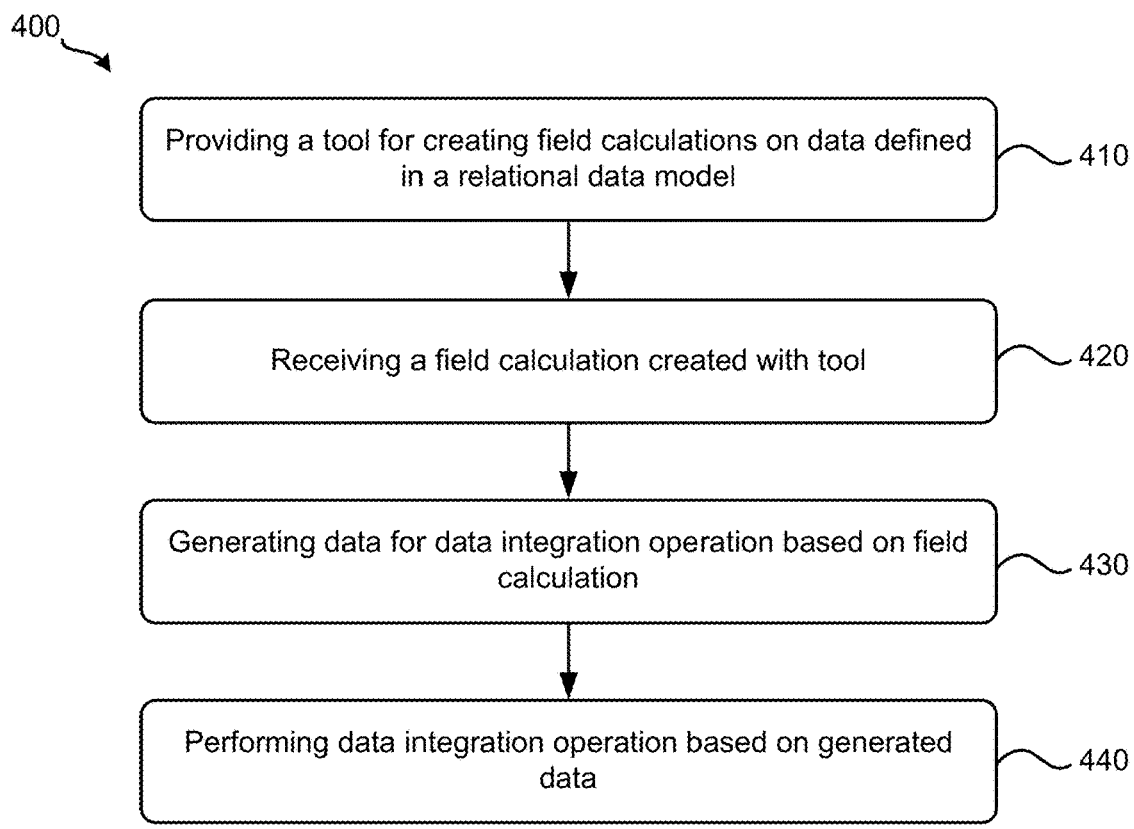
FIG. 4 illustrates a process for creating field calculations according to some embodiments.

An example data integration operation will now be describe by reference to FIGS. 2-5. FIG. 4 illustrates a process 400 for creating field calculations according to some embodiments. In some embodiments, data integration manager 110 performs process 400. Process 400 starts by providing, at 410, a tool for creating field calculations on data defined in a relational data model. Referring to FIG. 3 as an example, UI manager 310 may perform operation 410 by providing, through a GUI, a tool for creating field calculations that operate on data defined in relational data model 200 to client 305.

FIGS. 5A-5E illustrate a GUI 500 that includes a tool for creating field calculations according to some embodiments. Specifically, FIGS. 5A-5E illustrate GUI 500 at five different stages 501-505 of a field calculation creation operation. Before describing the field calculation creation operation, the elements of GUI 500 will first be described. As shown, GUI 500 in FIG. 5A includes text box control 508, selection control 510, field calculation tool 512, and selectable UI items 560 and 565. Text box control 508 is configured to receive input for a label associated a field calculation. In this example, a user of client 305 provided, through GUI 500, "Full Name" in text box control 508. Selection control 510 is for selecting a data type associated with fields in a field calculation. For this example, a user of client 305 selected the data type associated with fields in a field calculation as a string data type. One of ordinary skill in the art will appreciated that any number of additional and/or different data types (e.g., a numeric data type, a float data type, etc.) may be selected through selection control 510. Field calculation tool 512 is configured to create, add, edit/modify, delete, and display operation elements of a field calculation. Selectable UI item 560 is configured to terminate the field calculation creation operation and selectable UI item 565 is configured to create a field calculation for a data integration operation.

Figure 5A:
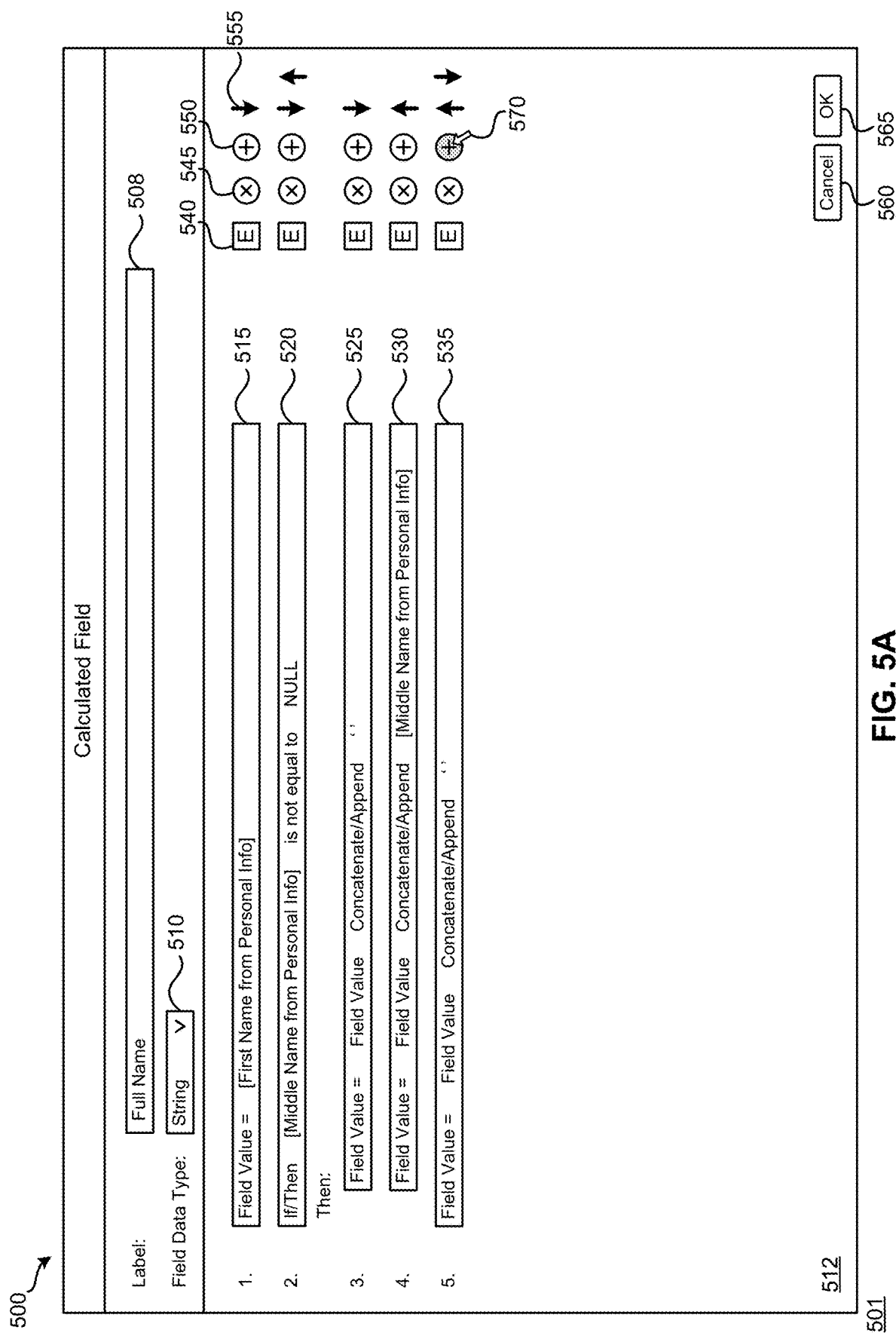
FIGS. 5A-5E illustrate a graphical user interface (GUI) that includes a tool for creating field calculations according to some embodiments.

The first stage 501 illustrated in FIG. 5A shows GUI 500 after several operation elements have been added to a field calculation. In particular, the first stage 501 of GUI 500 shows field calculation tool 512 with five operation elements 515, 520, 525, 530, and 535 of a field calculation. For this example, a user is creating a field calculation to generate a full name from the first name, middle name, and last name attributes of personal info entity 215. As such, operation element 515 represents assigning the first name attribute of personal info entity 215 to a variable "Field Value." Operation element 520 represents a condition for a conditional statement that the middle name attribute of personal info entity 215 is not null. Operation elements 525 and 530 represent operations to perform when the condition for the conditional statement represented in operation element 520 is true. Specifically, operation elements 525 and 530 represent operations to append a space and the middle name attribute of personal info entity 215 to the variable "Field Value." Operation element 535 represents an operation to append a space to the variable "Field Value."

As shown in FIG. 5A, each operation element 515, 520, 525, 530, and 535 has a set of selectable UI items associated with the corresponding operation element. For instance, selectable UI items 540, 545, 550, and 555 are associated with operation element 515. UI item 540 is for editing operation element 515, UI item 545 is for deleting operation element 515, UI item 550 is for adding an operation element after operation element 515, and UI item 555 is for moving operation element 515 (down one position between operation elements 520 and 525 in this example). Operation elements 520, 525, 530, and 535 have the same and/or similar selectable UI items associated with the operation elements.

The first stage 501 of GUI 500 also shows a user initiating an operation to add an operation element to the field calculation being created with field calculation tool 512. In this example, the user initiates the operation by selecting (e.g., using cursor 570) the selectable UI item associated with operation element 535 for adding an operation element after operation element 535. In addition, the operation element that the user will add for this example is an operation to append the last name attribute of personal info entity 215 to the variable "Field Value."

Figure 5B:
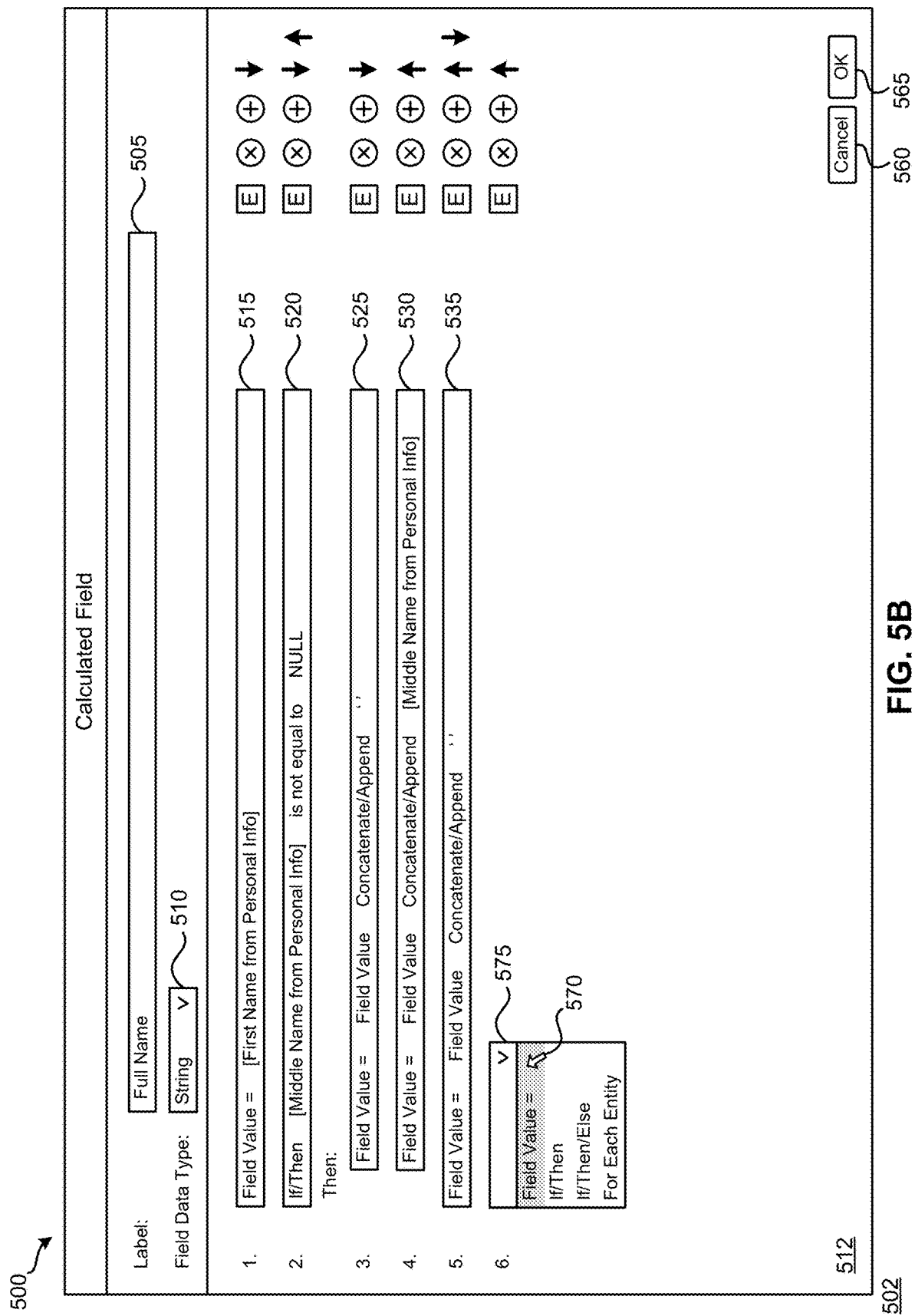

The second stage 502 illustrated in FIG. 5B shows GUI 500 after the operation to add an operation element to the field calculation being created with field calculation tool 512 has been initiated. As shown in the second stage 502, GUI 500 is displaying selection control 575 in field calculation tool 512. In this example, GUI 500 displays selection control 575 in response to the initiation of the operation to add an operation element to the field calculation being created with field calculation tool 512. Selection control 575 includes four operation options: an assignment operation for a variable "Field Value," an If/Then conditional operation, an If/Then/Else conditional operation, and a control flow operation (e.g., a while loop that iterates through instances of a particular entity). The second stage 502 also shows that a user is selecting (e.g., using cursor 570) the assignment operation for the variable "Field Value," as indicating by a highlighting of the option in selection control 575.

Figure 5C:
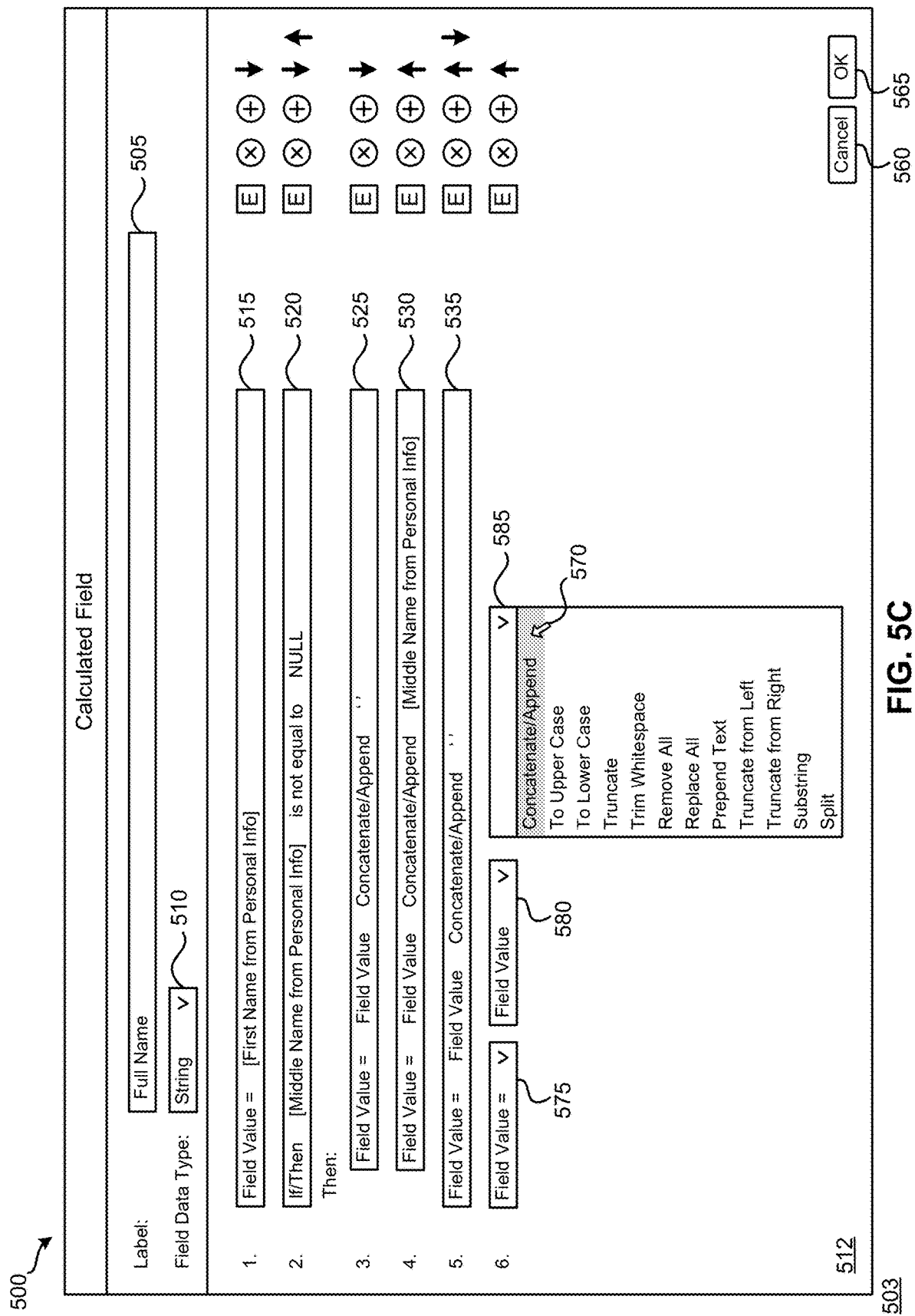

The third stage 503 shown in FIG. 5C illustrates GUI 500 after a user has selected an assignment operation for the variable "Field Value" and has selected an operand for the assignment operation, which is the variable "Field Value" in this example, via selection control 580. As shown, GUI 500 is displaying selection control 585 in field calculation tool 512. For this example, GUI 500 displays selection control 585 in response to a selection of an option selection control 580. Selection control 585 includes twelve string operation options: a concatenate/append operation, a conversion to upper case operation, a conversion to lower case operation, a truncate operation, a whitespace removal operation, a character removal operation, a replace character operation, a prepend operation, a truncate from left operation, a truncate from right operation, a substring extraction operation, and a string split operation. The third stage 503 also illustrates that a user is selecting (e.g., using cursor 570) the concatenate/append operation, as indicating by a highlighting of the option in selection control 585, for the operand selected via selection control 580 (the variable "Field Value" in this example).

Figure 5D:
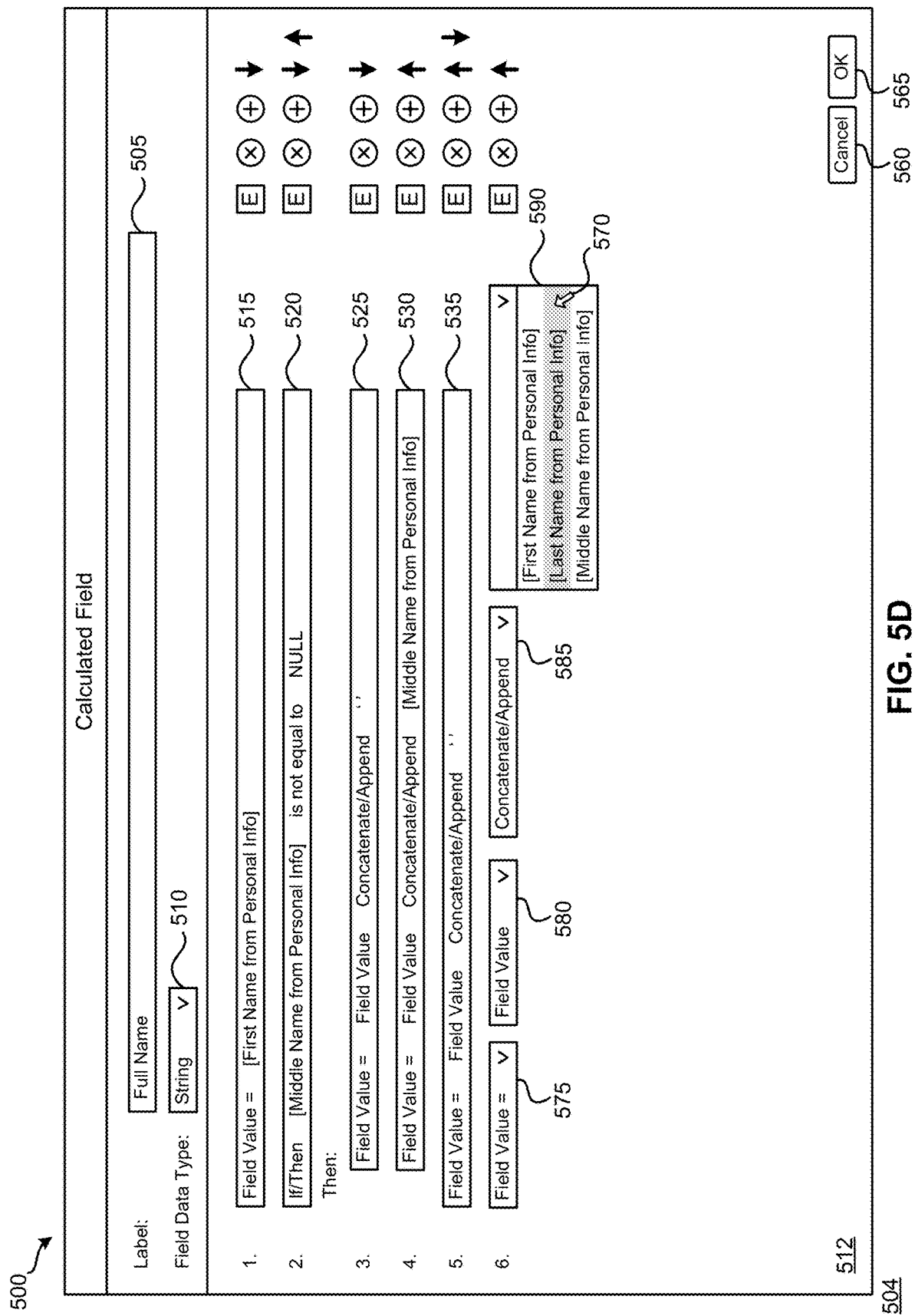

The fourth stage 504 illustrated in FIG. 5D shows GUI 500 after a user has selected a concatenate/append operation for the operand "Field Value". As illustrated in the fourth stage 504, GUI 500 is displaying selection control 590 in field calculation tool 512. In this example, GUI 500 displays selection control 580 in response to a selection of an option selection control 585. As shown, selection control 590 includes three string options: the first name attribute of personal info entity 215, the last name attribute of personal info entity 215, and the middle name attribute of personal info entity 215. The fourth stage 504 also shows that a user is selecting (e.g., using cursor 570) the last name attribute of personal info entity 215, as indicating by a highlighting of the option in selection control 590.

Figure 5E:
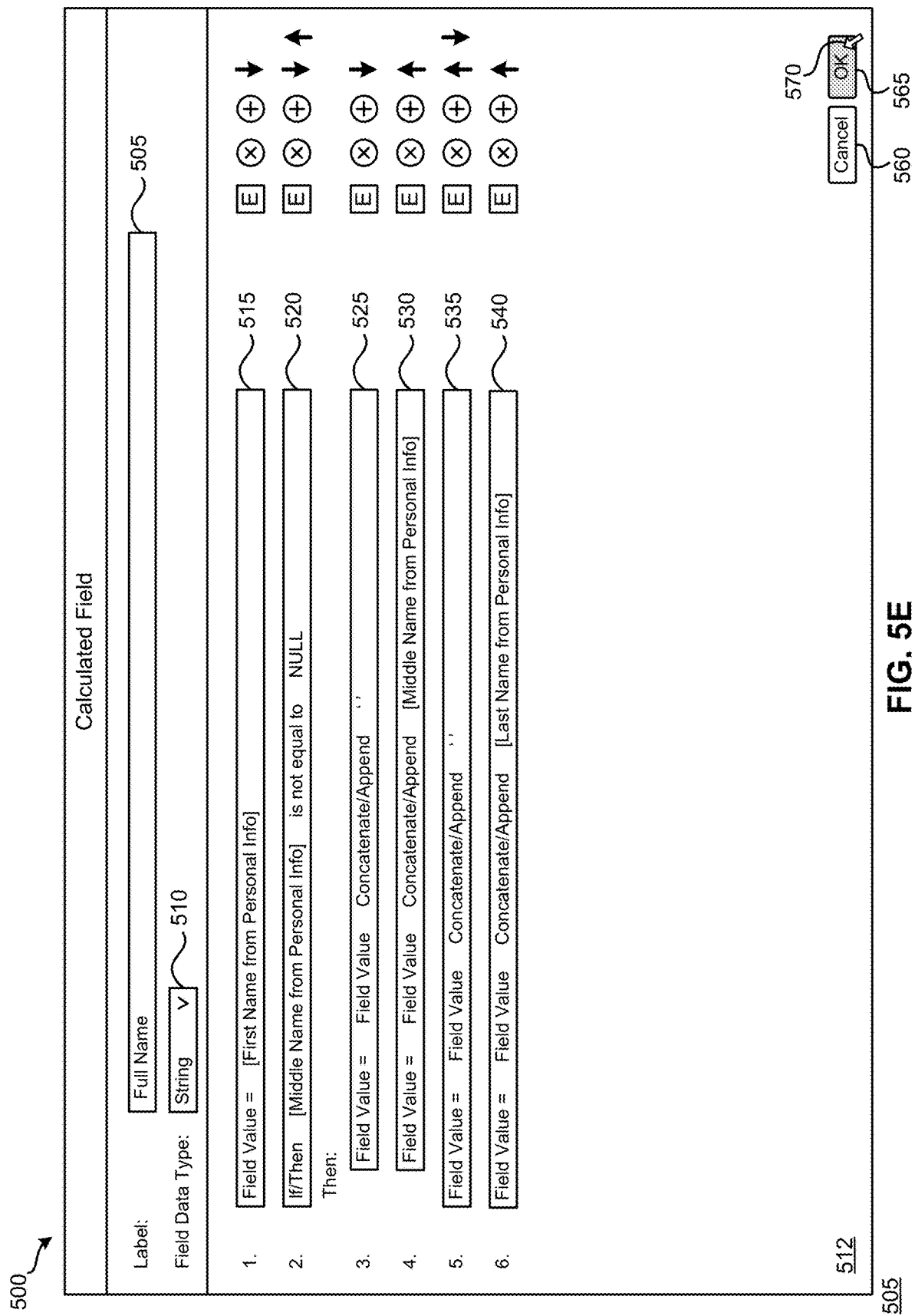

The fifth stage 505 shown in FIG. 5E illustrates GUI 500 after a user has selected the last name attribute of personal info entity 215 to concatenate to the variable "Field Value" and finished adding an operation element 540 that represents an operation to append the last name attribute of personal info entity 215 to the variable "Field Value.". The fifth stage 505 also shows that a user is selecting (e.g., using cursor 570) the UI item 565, as indicating by a highlighting of the UI item 565, to create a field calculation for a data integration operation. In this example, the field calculation for the data integration operation, as represented by operation elements 515, 520, 525, 530, 535, and 540 illustrated in field calculation tool 512, generates a full name from the first, middle, and last name attributes of personal info entity 215.

As illustrated in FIGS. 5A-5E, GUI 500 provides different types of selection controls when adding an operation element to a field calculation. In some embodiments, GUI 500 provides different types of selection controls based on the context of the operation element being created. (e.g., field data type, operand, etc.). For instance, GUI 500 provides a selection control (selection control 585 in this example) for selecting a string operator (as opposed to a numeric operator) in the third stage 503 based on the data type associated with fields in the field calculation specified by selection control 510 (a string data type in this example). As another example, GUI 500 provides a selection control (selection control 585 in this example) for selecting a string operator in the third stage 503 based on the previous selection control 580 being a selection control for selecting a string operand. As yet another example, GUI 500 provides a selection control for selecting a string operand in the fourth stage 504 based on the previous selection control 585 being a selection control for selecting a string operator.

As described above, FIGS. 5A-5E illustrate an example field calculation that operates on attributes of an entity in a relational data model. One of ordinary skill in the art will understand that any number of different types of field calculations may be created with field calculation tool 512 provided in GUI 500. For instance, field calculation tool 512 may be used to create a field calculation that operates on different attributes of different entities in a relational data model. As another example, field calculation tool 512 may be used to create a field calculation that operates on numeric values.

Returning back to FIG. 4, process 400 then receives, at 420, a field calculation created with the tool. Referring to FIG. 3 as an example, UI manager 310 may perform operation 420 by receiving a field calculation created with field calculation tool 512 from client 305. In this example data integration operation, UI manager 310 receives the field calculation created with field calculation tool 512 as shown in FIGS. 5A-5E.

Next, process 400 generates, at 430, data for a data integration operation based on the field calculation. Referring to FIG. 3 as an example, UI manager 310 may send the field calculation to data manager 320 and instruct data manager 320 to perform operation 430. In some embodiments, data manager 310 performs operation 430 by accessing data specified in the field calculation from data source 105. For this example data integration operation, the requested data is the full name of a person. As such, data manager 320 retrieves the first name, middle name, and last name of each person in data source 105, generates data based on the field calculation and the retrieved data.

Finally, process 400 performs, at 440, the data integration operation based on the generated data. In some embodiments, process 400 may receive a selection of one or more systems on which the data integration operation is performed (e.g., via a GUI provided by UI manager 310 to client 305). In other embodiments, the one or more systems on which the data integration operation is performed is preconfigured.

Referring to FIG. 3 as an example, data manager 320 may perform operation 440 by sending the generated data to the specified systems 115 for integration into the specified systems 115. As mentioned above, in this example data integration operation, the requested data is the full name of a person. As such, data manager 320 sends the generated full names based on the field calculation to the specified systems 115 for integration into the specified systems 115.

Figure 6:
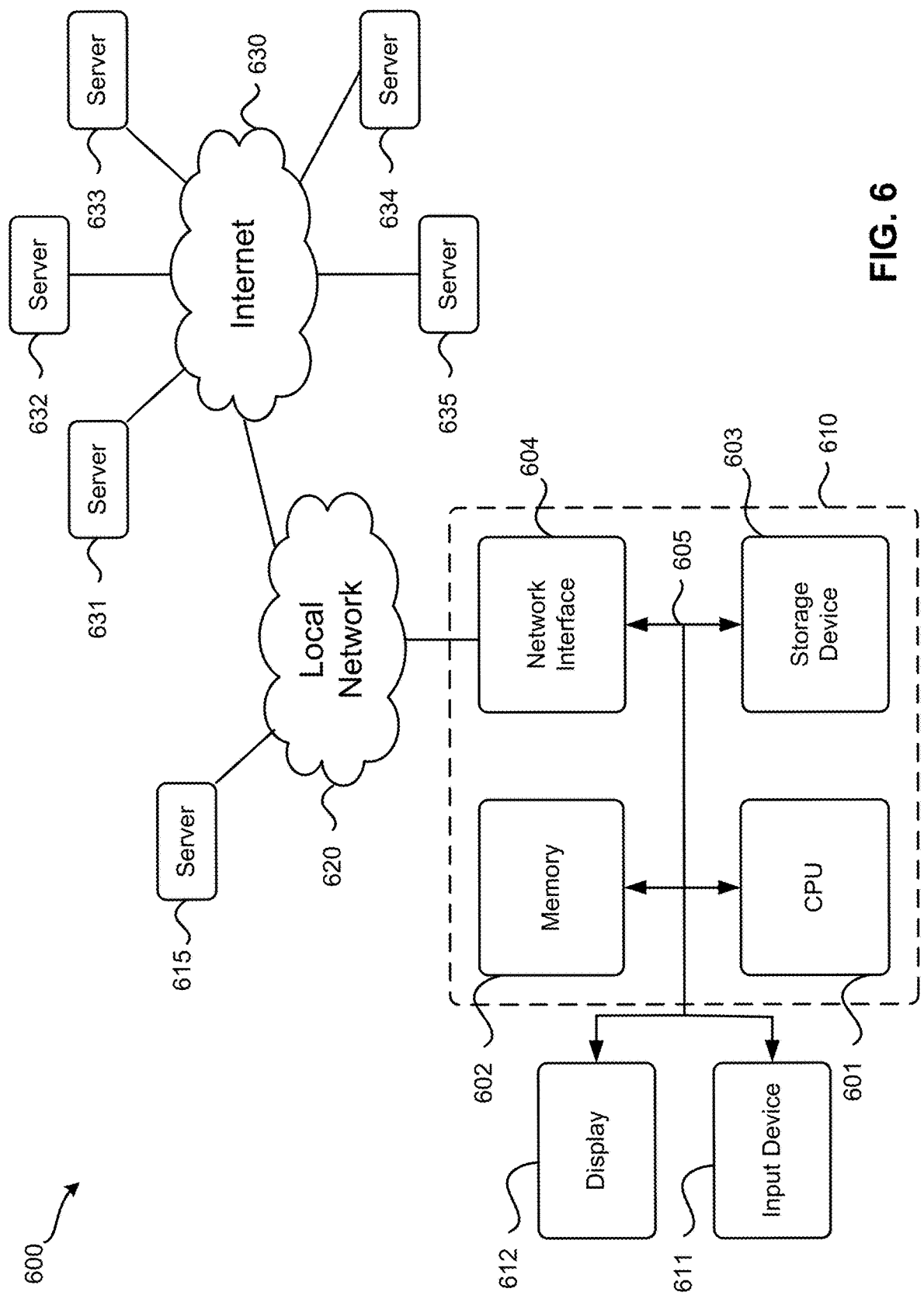
FIG. 6 illustrates an exemplary computer system according to some embodiments.

An exemplary computer system 600 is illustrated in FIG. 6. Computer system 610 includes a bus 605 or other communication mechanism for communicating information, and a processor 601 coupled with bus 605 for processing information. Computer system 610 also includes memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:

receiving, by the device and from a client device, a request to integrate data from a first system into a second system, wherein the first system and the second system are different;

providing, from the device to the client device, through a graphical user interface (GUI), a tool for creating a set of operational elements for a field calculation that operates on a first set of data defined according to a relational data model and stored in the first system, wherein the relational data model defines a set of entities and relationships among the set of entities, wherein each entity in the set of entities comprise a set of attributes, wherein each operational element in the set of operational elements specifies an operation to perform on an attribute of an entity in the set of entities;

providing, from the device and to the client device, through the GUI, a user interface (UI) control for selecting a data type for the field calculation;

receiving, by the device and from the client device, through the GUI, the field calculation created using the tool;

receiving, by the device and from the client device, through the UI control, a selection of the data type for the field calculation;

receiving, by the device and from the first system, the first set of data;

generating, by the device, a second set of data by performing the operations specified in the set of operational elements of the field calculation on the first set of data, the second set of data having the selected data type; and sending, from the device to the second system, the second set of data in order for the second system to integrate the second set of data into the second system.

2. The non-transitory machine-readable medium of claim 1, wherein the UI control is a first UI control, wherein the program further comprises a set of instructions for providing, from the device to the client device, through the GUI, a second UI control for specifying an operation element for the field calculation.

3. The non-transitory machine-readable medium of claim 2, wherein the set of instructions for providing the second UI control comprises a set of instructions for providing the second UI control based on the data type selected for the field calculation.

4. The non-transitory machine-readable medium of claim 2, wherein the program further comprises a set of instructions for providing, from the device to the client device, through the GUI, a third UI control for specifying the operation element for the field calculation based on the second UI control.

5. The non-transitory machine-readable medium of claim 4, wherein the second UI control is for specifying an operand in the operation element for the field calculation, wherein the third UI control is for specifying an operator in the operation element for the field calculation.

6. The non-transitory machine-readable medium of claim 1, wherein the first system comprises a data source configured to store the first set of data, wherein the set of instructions for receiving the first set of data comprises a set of instructions for retrieving, by the device, the first set of data from the data source of the first system according to the relational data model and the field calculation.

7. The non-transitory machine-readable medium of claim 1, wherein the request is a first request, wherein the tool for creating the set of operational elements for the field calculation is a first tool for creating a first set of operational elements for a first field calculation, wherein the relational data model is a first relational data model, wherein the UI control is a first UI control, wherein the selection of the data type is a first selection of a first data type, wherein the program further comprises sets of instructions for:

receiving, by the device and from the client device, a second request to integrate data from a third system into a fourth system, wherein the third system and the fourth system are different;

providing, from the device to the client device, through the GUI, a second tool for creating a second set of operational elements for a second field calculation that operates on a third set of data defined according to a second relational data model and stored in the third system, wherein the second relational data model defines a second set of entities and relationships among the second set of entities, wherein each entity in the second set of entities comprise a set of attributes, wherein each operational element in the second set of operational elements specifies an operation to perform on an attribute of an entity in the set of entities;

providing, from the device and to the client device, through the GUI, a second user interface (UI) control for selecting a second data type for the second field calculation;

receiving, by the device and from the client device, through the GUI, the second field calculation created using the second tool;

receiving, by the device and from the client device, through the second UI control, a second selection of the second data type for the second field calculation;

receiving, by the device and from the third system, the third set of data;

generating, by the device, a fourth set of data by performing the operations specified in the second set of operational elements of the second field calculation on the third set of data, the fourth set of data having the selected data type; and sending, from the device to the fourth system, the fourth set of data in order for the fourth system to integrate the fourth set of data into the fourth system.

8. A method, executable by a device, comprising:

receiving, by the device and from a client device, a request to integrate data from a first system into a second system, wherein the first system and the second system are different;

providing, from the device to the client device, through a graphical user interface (GUI), a tool for creating a set of operational elements for a field calculation that operates on a first set of data defined according to a relational data model and stored in the first system, wherein the relational data model defines a set of entities and relationships among the set of entities, wherein each entity in the set of entities comprise a set of attributes, wherein each operational element in the set of operational elements specifies an operation to perform on an attribute of an entity in the set of entities;

providing, from the device and to the client device, through the GUI, a user interface (UI) control for selecting a data type for the field calculation;

receiving, by the device and from the client device, through the GUI, the field calculation created using the tool;

receiving, by the device and from the client device, through the UI control, a selection of the data type for the field calculation;

receiving, by the device and from the first system, the first set of data;

generating, by the device, a second set of data by performing the operations specified in the set of operational elements of the field calculation on the first set of data, the second set of data having the selected data type; and sending, from the device to the second system, the second set of data in order for the second system to integrate the second set of data into the second system.

9. The method of claim 8, wherein the UI control is a first UI control, the method further comprising providing, from the device to the client device, through the GUI, a second UI control for specifying an operation element for the field calculation.

10. The method of claim 9, wherein providing the second UI control comprises providing the second UI control based on the data type selected for the field calculation.

11. The method of claim 9, wherein the method further comprises providing, from the device to the client device, through the GUI, a third UI control for specifying the operation element for the field calculation based on the second UI control.

12. The method of claim 11, wherein the second UI control is for specifying an operand in the operation element for the field calculation, wherein the third UI control is for specifying an operator in the operation element for the field calculation.

13. The method of claim 8, wherein the first system comprises a data source configured to store the first set of data, wherein receiving the first set of data comprises retrieving, by the device, the first set of data from the data source of the first system according to the relational data model and the field calculation.

14. The method of claim 8, wherein the request is a first request, wherein the tool for creating the set of operational elements for the field calculation is a first tool for creating a first set of operational elements for a first field calculation, wherein the relational data model is a first relational data model, wherein the UI control is a first UI control, wherein the selection of the data type is a first selection of a first data type, wherein the method further comprises:

receiving, by the device and from the client device, a second request to integrate data from a third system into a fourth system, wherein the third system and the fourth system are different;

providing, from the device to the client device, through the GUI, a second tool for creating a second set of operational elements for a second field calculation that operates on a fourth set of data defined according to a second relational data model and stored in a fourth system, wherein the second relational data model defines a second set of entities and relationships among the second set of entities, wherein each entity in the second set of entities comprise a set of attributes, wherein each operational element in the second set of operational elements specifies an operation to perform on an attribute of an entity in the set of entities;

providing, from the device and to the client device, through the GUI, a second user interface (UI) control for selecting a second data type for the second field calculation;

receiving, by the device and from the client device, through the GUI, the second field calculation created using the second tool;

receiving, by the device and from the client device, through the second UI control, a second selection of the second data type for the second field calculation;

receiving, by the device and from the third system, the third set of data;

generating, by the device, a fourth set of data by performing the operations specified in the second set of operational elements of the second field calculation on the third set of data, the fourth set of data having the selected data type; and sending, from the device to the fourth system, the fourth set of data in order for the fourth system to integrate the fourth set of data into the fourth system.

15. A first system comprising:

a set of processing units;

a non-transitory machine-readable medium storing a program executable by at least one processing unit in the set of processing units, the program comprising sets of instructions for:

receiving, by the first system and from a client device, a request to integrate data from a second system into a third system, wherein the second system and the third system are different;

providing, from the first system to the client device, through a graphical user interface (GUI), a tool for creating a set of operational elements for a field calculation that operates on a first set of data defined according to a relational data model and stored in the second system, wherein the relational data model defines a set of entities and relationships among the set of entities, wherein each entity in the set of entities comprise a set of attributes, wherein each operational element in the set of operational elements specifies an operation to perform on an attribute of an entity in the set of entities;

providing, from the first system and to the client device, through the GUI, a user interface (UI) control for selecting a data type for the field calculation;

receiving, by the first system and from the client device, through the GUI, the field calculation created using the tool;

receiving, by the first system and from the client device, through the UI control, a selection of the data type for the field calculation;

receiving, by the first system and from the second system, the first set of data;

generating, by the first system, a second set of data by performing the operations specified in the set of operational elements of the field calculation on the first set of data, the second set of data having the selected data type; and sending, from the first system to the third system, the second set of data in order for the third system to integrate the second set of data into the third system.

16. The first system of claim 15, wherein the UI control is a first UI control, wherein the program further comprises a set of instructions for providing from the first system to the client device, through the GUI, a second UI control for specifying an operation element for the field calculation.

17. The first system of claim 16, wherein the set of instructions for providing the second UI control comprises a set of instructions for providing the second UI control based on the data type selected for the field calculation.

18. The first system of claim 16, wherein the program further comprises a set of instructions for providing from the first system to the client device, through the GUI, a third UI control for specifying the operation element for the field calculation based on the second UI control.

19. The first system of claim 18, wherein the second UI control is for specifying an operand in the operation element for the field calculation, wherein the third UI control is for specifying an operator in the operation element for the field calculation.

20. The first system of claim 15, wherein the second system comprises a data source configured to store the first set of data, wherein the set of instructions for receiving the first set of data comprises a set of instructions for retrieving, by the first system, the first set of data from the data source of the second system according to the relational data model and the field calculation.

* * * * *